US008732163B2

(12) United States Patent
Halasipuram et al.

(10) Patent No.: US 8,732,163 B2
(45) Date of Patent: May 20, 2014

(54) QUERY OPTIMIZATION WITH MEMORY I/O AWARENESS

(75) Inventors: Ramanujam Seshadri Halasipuram, Magarpatta (IN); Edwin Anthony Seputis, Oakland, CA (US)

(73) Assignee: Sybase, Inc., Dublin, CA (US)

( * ) Notice: Subject to any disclaimer, the term of this patent is extended or adjusted under 35 U.S.C. 154(b) by 19 days.

(21) Appl. No.: 12/535,270

(22) Filed: Aug. 4, 2009

(65) Prior Publication Data

US 2011/0035369 A1 Feb. 10, 2011

(51) Int. Cl.
*G06F 17/30* (2006.01)

(52) U.S. Cl.
USPC .......................................... 707/720

(58) Field of Classification Search
USPC .................................. 707/719, 720
See application file for complete search history.

(56) References Cited

U.S. PATENT DOCUMENTS

| | | | | |
|---|---|---|---|---|
| 6,470,330 B1* | 10/2002 | Das et al. | | 707/718 |
| 6,810,361 B1* | 10/2004 | Anderson | | 702/186 |
| 6,957,211 B1* | 10/2005 | Tyulenev et al. | | 707/718 |
| 7,308,437 B2* | 12/2007 | Day et al. | | 707/999.004 |
| 7,941,425 B2* | 5/2011 | Sahu et al. | | 707/718 |
| 2006/0031189 A1* | 2/2006 | Muras et al. | | 707/2 |
| 2006/0136396 A1* | 6/2006 | Brobst | | 707/3 |
| 2006/0271504 A1* | 11/2006 | Anderson et al. | | 707/2 |
| 2008/0104014 A1* | 5/2008 | Burger et al. | | 707/2 |
| 2009/0063398 A1* | 3/2009 | Bhatia et al. | | 707/2 |
| 2009/0106306 A1* | 4/2009 | Das et al. | | 707/103 R |
| 2010/0198811 A1* | 8/2010 | Wiener et al. | | 707/718 |

OTHER PUBLICATIONS

Volker Markl et al., "LEO: An Autonomic Query Optimizer for DB2", 2003, IBM Systems Journal, vol. 42, No. 1, pp. 98-106.*
Ravishankar Ramamurthy & David J. DeWitt, "Buffer Pool Aware Query Optimization", 2005, Proceedings of Conference on Innovative Data Systems Research, 12 pages.*
Ramanujam H. S. & Edwin Seputis, "Warm Cache Costing—A Feedback Optimization Technique for Buffer Pool Aware Costing", Mar. 26, 2010, ACM EDBT, 9 pages.*

* cited by examiner

*Primary Examiner* — Rehana Perveen
*Assistant Examiner* — Scott A Waldron
(74) *Attorney, Agent, or Firm* — Sterne, Kessler, Goldstein & Fox P.L.L.C.

(57) ABSTRACT

System, method, computer program product embodiments and combinations and sub-combinations thereof for tuning query execution performance in a database management system are described. In an aspect, query optimization in a database management system (DBMS) with memory I/O (input/output) awareness includes determining compensated physical I/O (PIO) values indicative of memory I/O operations, including an approximate cache occupancy level, of an executing query in a DBMS, and utilizing the compensated PIO values as feedback to a query optimizer of the DBMS for optimization of future query execution.

22 Claims, 5 Drawing Sheets

L_RECEIPTDATE <= "Feb 23 1992"
and L_SHIPDATE <= "Feb 8 1992"
and L_ORDERKEY = O.O_ORDERKEY
[...]

/
        NestLoopJoin
        Inner Join
        (VA = 2)
        r:12458 er:40
   /                \

| IndexScan | IndexScan |
|---|---|
| LINEITEM_SHIPDAT (LI) | ORDER_X (O) |
| (VA = 0) | (VA = 1) |
| r:12458 er:40 | r:12458 er:40 |
| l:14987 el:14936 | l:37374 el:119 |
| p:0 ep:14386 | p:0 ep:42 |
| [...] | |

QUERY OPTIMIZATION WITH MEMORY I/O AWARENESS

BACKGROUND

1. Field of the Invention

The present invention is directed to tuning query execution performance of a database system through query optimization with memory I/O (input/output) awareness.

2. Background Art

Computers are very powerful tools for storing and providing access to vast amounts of information. Databases are a common mechanism for storing information on computer systems while providing easy access to users. A typical relational database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details.

One purpose of a database system is to answer queries requesting information from the database. A query may be defined as a logical expression over the data and the data relationships set forth in the database, and execution of a query results in the identification of a subset of the database. In operation, for instance, the execution of a request for information from a relational DBMS is typically issued by a client system as one or more Structured Query Language or "SQL" queries for retrieving particular data (e.g., a list of all employees earning more than $25,000) from database tables on a server. In response to this request, the database system typically returns the names of those employees earning $25,000, where "employees" is a table defined to include information about employees of a particular organization. The syntax of SQL is well documented, see e.g., "Information Technology—Database languages—SQL", published by the American National Standards Institute as American National Standard ANSI/ISO/IEC 9075: 1992, the disclosure of which is hereby incorporated by reference.

SQL queries express what results are requested but do not state how the results should be obtained. In other words, the query itself does not tell how the query should be evaluated by the DBMS. Rather, a component of the DBMS called the optimizer determines the "plan" or the best method of accessing the data to implement the SQL query. The query optimizer is responsible for transforming a SQL request into an access plan composed of specific implementations of the algebraic operator selection, projection, join, and so forth. The role of a query optimizer in a relational DBMS system is to find an adequate execution plan from a search space of many semantically equivalent alternatives.

Most modern query optimizers for relational database management systems (RDBMS) determine the best query execution plan for executing a SQL query by mathematically modeling the execution cost for each plan and choosing the valid cheapest plan. An example of a learning optimizer is described in U.S. Pat. No. 6,763,359, which provides an approach for selection of a query execution plan that utilizes statistics collected during query execution that are fed back to an optimizer to allow it to learn of a modeling mistake in a query execution plan.

Though this basic approach to query optimization has not changed dramatically over the years, much of the rest of the environment in which the databases operate has. For example, processors have become exceedingly faster and memories have become many times bigger. The ability to execute increasingly complex queries over very large database (VLDB) environments has grown at a higher rate than the ability to optimize such complex queries. Attention to query optimization is occurring with more emphasis on modeling optimizers to the dynamic nature of the databases.

Since the physical I/O (PIO) is a costly operation to execute, it naturally has an important weight in DBMS classical cost models, which assume that the data is disk-resident and does not fit in the available main memory. However, this assumption is no longer true with the advent of cheap large main memories. Those plans which are considered to be cheap might not be actually so, if the base tables (or part of them) are instead available in the main memory. Further, optimizers that ignore the contents of the buffer pool while optimizing queries can identify sub-optimal plans. While the aforementioned U.S. Pat. No. 6,763,359 generally mentions that sizes of buffer pools can be adjusted in response to a detected lack of buffer resources for certain queries as a way of self-tuning system configuration, it fails to provide a manner of determining the necessary information to perform such tuning nor does it provide an approach for evaluating and utilizing PIO data that would allow the reoptimization of queries by the optimizer.

Accordingly, a need exists for an ability to provide better awareness of buffer pool and memory I/O usage in query optimization. The present invention provides a solution for these and other needs.

BRIEF SUMMARY

Briefly stated, the invention includes system, method, computer program product embodiments and combinations and sub-combinations thereof for tuning query execution performance in a database management system. In an aspect for query optimization in a database management system (DBMS) with memory I/O (input/output) awareness, the invention includes determining compensated physical I/O (PIO) values indicative of memory I/O operations, including an approximate cache occupancy level, of an executing query in a DBMS, and utilizing the compensated PIO values as feedback to the query optimizer of the DBMS for optimization of future queries.

The embodiments of the present invention result in significant improvement in query execution time through memory I/O awareness and feedback to the optimizer by considering buffer cache contents during query optimization. The improvements occur with negligible overhead and compensation for unknown correlated access patterns. Ease of implementation is realized, since no changes to the buffer manager or other modules underlying the query processing layer are required.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for tuning query execution performance of a database system.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
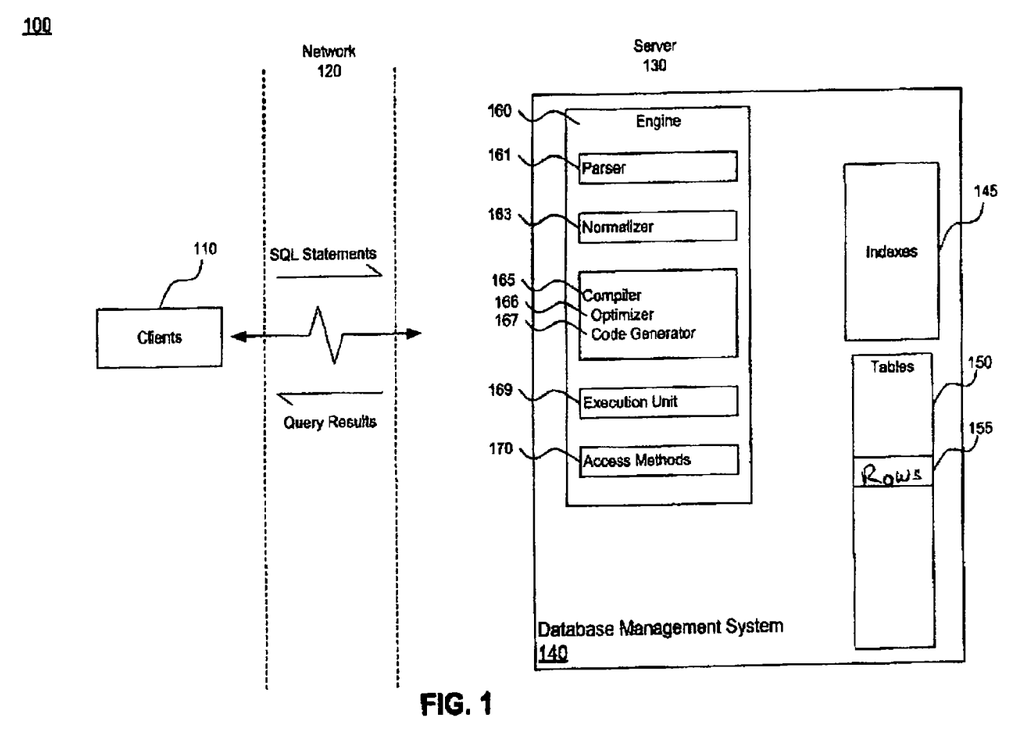
FIG. 1 illustrates an exemplary database management system (DBMS), according to an embodiment of the invention.

Embodiments of the invention may operate in the example client/server database system 100 shown in FIG. 1. System 100 includes one or more clients 110 in communication with a server 130 via a network 120. A database management system (DBMS) 140 resides in the server 130. It is noted that the example client/server database system 100 is shown in FIG. 1 and discussed herein solely for purposes of illustration, and not limitation. The invention is not limited to the example of FIG. 1.

In operation, clients 110 store data in, or retrieve data from, rows 155 of database tables 150 by issuing SQL statements to DBMS 140. Generally, data in a relational database is stored as a series of tables, also called relations. Typically resident on the server 130, each table itself comprises one or more "rows" or "records" (tuples). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number (SSN), and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of SQL. SQL statements may be divided into two categories: data manipulation language (DML), used to read and write data; and data definition language (DDL), used to describe data and maintain the database. DML statements are also called queries. In operation, for example, the clients 110 issue one or more SQL commands to the server 130. SQL commands may specify, for instance, a query for retrieving particular data (i.e., data records meeting the query condition) from the database table(s) 150. In addition to retrieving the data from database server table(s) 150, the clients 110 also have the ability to issue commands to insert new rows of data records into the table(s), or to update and/or delete existing records in the table(s).

SQL statements received from clients 110 are processed by query engine 160 of the DBMS 140. In an embodiment, query engine 160 comprises parser 161, normalizer 163, compiler 165, query optimizer 166, code generator 167, execution unit 169 and access methods 170, which shall now be generally described.

SQL statements received from clients 110 are passed to the parser 161 which converts the statements into a query tree, which is a binary tree data structure that represents the components of the query in a format selected for the convenience of the system. In this regard, the parser 161 employs well known parsing methodology (e.g., recursive descent parsing).

The query tree is normalized by the normalizer 163. Normalization includes, for example, the elimination of redundant data. Additionally, the normalizer 163 may perform error checking, such as confirming that table names and column names which appear in the query are valid (e.g., are available and belong together). Finally, the normalizer 163 may also look up any referential integrity constraints which exist and add those to the query.

After normalization, the query tree is passed to the compiler 165, which includes query optimizer 166 and a code generator 167. Query optimizer 166 is responsible for optimizing the query tree. In an embodiment, query optimizer 166 performs a cost-based analysis for formulating a query execution plan. Query optimizer 166 will, for example, select the join order of tables, and select relevant indexes (e.g., indexes 145 when available). Query optimizer 166, therefore, performs an analysis of the query and determines the best execution plan, from a plurality of generated execution plans, and where "best" is judged according to any defined criteria, which in turn results in particular access methods 170 being invoked during query execution by the execution unit 169.

In operation, DBMS 140 has a certain amount of memory at the server 130 available for its use. All data in a typical relational database system is stored in pages on a secondary storage device, usually a hard disk. Typically, these pages may range in size from 1 Kb (kilobyte) to 32 Kb, with the most common page sizes being 2 Kb and 4 Kb. All input/output operations (I/O) against secondary storage are done in page-sized units—that is, the entire page is read/written at once. The memory in which pages that have been read from disk reside is called the cache or buffer pool.

Typically, during configuration of this system, the DBA (database administrator) user would indicate how much memory is available for DBMS 140 use. This establishes a region of server memory which is available for caching. In conventional transaction-based database systems, creation of a buffer pool comprising fixed-size buffer caches is done to support I/O operations.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache (i.e., those pages that would be considered 'hot'). Alternatively, it can be done by being more selective about what pages are loaded into the cache in the first place such as limiting scans. An additional consideration with respect to I/O is whether it is sequential or random. Due to the construction of hard disks, sequential I/O is much faster then random access I/O. Data structures and algorithms encouraging the use of sequential I/O can realize greater performance.

Optimizers commonly assume that all the base tables involved in the query are disk-resident. Even though this assumption is generally safe, as main memories increase in size, those plans which are considered to be cheap by an optimizer might not be actually so, if the base tables (or part of them) are instead available in the main memory. Further, optimizers that ignore the contents of the buffer pool while optimizing queries can generate sub-optimal plans.

By way of example, the following is a simplified version of query 14 of TPCH (Transaction Processing Performance Council H) data suite:

```
SELECT L_ORDERKEY, L_QUANTITY, L_EXTENDEDPRICE
FROM LINEITEM
WHERE L_SHIPDATE < '2004 - 01 - 01'
```

In evaluating this query, the optimizer 166 has many options, including use of non clustered (NC) index-LINEITEM_SHIPDATE defined on L_SHIPDATE to filter the rows (RIDs, in specific) and do a data page lookup, use of covered NC index-LINEITEM_SUPPPART, or use of a table scan on the LINEITEM table, as is well understood in the art. Generally, beyond a threshold value in predicate selectivity, optimizer 166 will almost always pick the table scan. However, if the data pages that are actually accessed when evaluating the predicate are already in the buffer cache, using index scan might be faster. Data cached in the buffer cache might also affect other choices made during query optimization including join ordering and the selection of a join algorithm.

While prior attempts have been made to consider the cache contents while optimizing the queries, generally these approaches enquire the buffer manager to find out the cache occupancy information to give fairly exact predictions of cache contents. Unfortunately, the cost of obtaining such exact information is quite considerable in commercial database systems, and the changes required at the buffer manager level for such changes are considerably high.

Further, when trying to consider cache contents, it is possible that correlations between data may not be known. Therefore, an access path, which may seem to have poor cache hits with many physical I/Os assuming random independent events, might actually have very good cache hits with few physical I/Os for a respective index scan. Given these factors, in accordance with the present invention, a novel feedback optimization technique for considering buffer cache contents during query optimization is provided. As will be described, the approach derives approximate cache occupancy information in a manner with least cost and substantially non-intrusively, where approximate cache occupancy is considered a good-enough measure based on an assumption that cache sizes for databases are tuned to make sure pages that are referenced in a certain time period, e.g., every five minutes, are resident in memory. While the period of five minutes is well understood as a sound choice (see, for example, "The five-minute rule twenty years later, and how flash memory changes the rules" in *Proceedings of DaMoN,* 2007), this is meant as illustrative and not restrictive.

Figure 2:
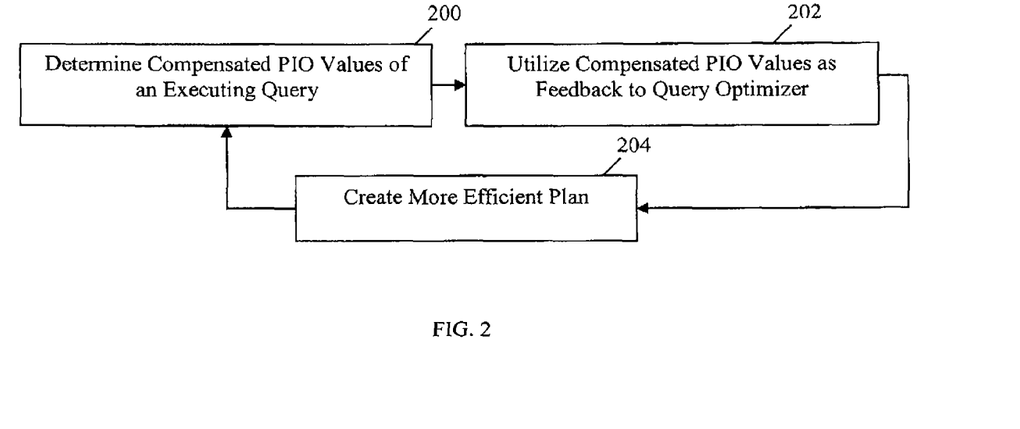
FIG. 2 illustrates a flow diagram representation of query optimization with memory I/O awareness in accordance with embodiments of the invention.

FIG. 2 illustrates a flow diagram representation of query optimization with memory I/O awareness in accordance with embodiments of the invention. The process includes determination of compensated PIO (PIOC) values of an executing query (block 200) and utilization of the compensated PIO values as feedback to the optimizer (block 202). Through the embodiments of the present invention, the optimizer 166 learns the average difference between the PIO estimated by its costing module and the PIO actually spent by the query execution unit 169 to read the data. As will described more fully below, the determination of the compensated PIO values includes determining average fractional ratios between an estimated PIO cost and an actual PIO cost of at least one of index scans and table scans in query execution. Further described are the possible multiple values. Since a query can reference several tables, and each table can have several underlying indices, each index scan can result in consideration of multiple compensation factors.

The compensated PIO values can then be used to create a more efficient query plan (block 204) for the optimization of successive queries with more accurate estimation of the number of PIOs, and correspondingly, an approximate cache occupancy level, thereby allowing the optimizer 166 to select a better plan. The dynamic feedback nature of the embodiments of the invention provides a self-tuning correction when external events occur, such as adding more buffer cache, which may reduce actual PIO, or introducing a new application to the DBMS, which may reduce the cache hits of existing applications and increase the actual PIO.

As will be described, the compensated PIO values are dynamically maintained and updated as queries are executed, which allows the feedback to more closely model the cache behavior. The compensated PIO values refer to PIOC factors which are maintained in the system catalogs. In an embodiment, these values are object, partition, cache type, and mass size as a combination that are cached in the memory in the catalog information for a partition, PDES (partition descriptor), as is commonly understood. Further, at the end of execution of every query, PIO mis-estimation is identified and a current PIOC (currPIOC) is calculated based on the formulae described below. Using the PIOC as it exists from the PDES (oldPIOC) and the currPIOC, a new PIOC is calculated (newPIOC) and updated back in the corresponding PDES.

In determining the compensated PIO values, estimated PIOs are utilized and based on the statistics resulting from a cost evaluation of a query by the optimizer. In general, the cost of an operator is a function of the number of logical I/Os (LIOs), the number of PIOs and the cost of CPU operations over the rows processed. When an ad hoc query is being evaluated, the costing module estimates LIOs, using the statistics available on the object. Then, depending on the number of times the object is accessed, the type of the access path, the size of the buffer cache available, etc., PIOs for the object are calculated. These are referred to as estimatedLIO and estimatedPIO, respectively, in the subsequent description. The resultant alternative plans are then evaluated for selection of the cheapest plan, subject to the validity of the plan. The corresponding estimated values are propagated on from the costing module to the execution unit 169.

Figure 3:
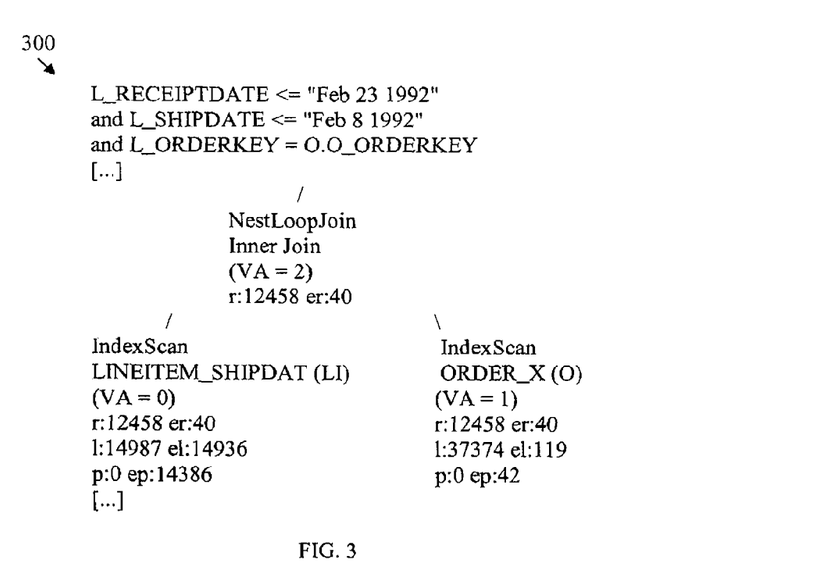
FIG. 3 illustrates an example of a query, plan, and statistics plan cost output in accordance with embodiments of the invention.

Once the selected best plan is passed to the execution unit 169, it is executed and the actual execution statistics that the plan incurs are captured. Thus, as part of the execution of the query, the execution unit 169 captures actualLIOs and actualPIOs, i.e., the LIOs and PIOs actually spent in answering the query. An example 300 of a query, plan, and statistics plan cost output based on a Sybase Adaptive Server Enterprise (ASE) environment is shown in FIG. 3. The plan cost output contains the estimated and actual values of different metrics, where the value of "r:" and "er:" correspond to actual and estimated rows, respectively. Similarly, the value of "l:", "el:", and "p:", "ep:" correspond to the actual and estimated values of LIO and PIO, respectively.

While this information is generally used for debugging and detecting bottle-neck operators in the execution plan in case of performance problems, these execution metrics are also able to provide an understanding on the dynamic nature of the buffer cache in the DBMS.

Since the cost models assume that the object is disk-resident, it is possible for the actualPIO and the estimatedPIO to be different. In accordance with an embodiment of the invention, this difference is captured as a PIO Compensation Factor (PIOC):

PIOC=actualPIO/estimatedPIO

A difference in the estimatedPIO and the actualPIO may result because of stale/missing statistics or because of an incorrect row count estimation of the objects proceeding in the join order. Thus, a mismatch in estimation can happen in row count, LIO, and thus PIO, not just because of availability of the table in cache but because of other inconsistencies too. Filtering out the misestimations due to such inconsistencies ensures that the process only caters to a PIO difference because of cache occupancy/cache hits.

Thus, to avoid such issues, unit PIO misestimation is calculated by proportioning the estimatedPIO with estimatedLIO:

estimatedPIOperLIO = estimatedPIO/ estimatedLIO
Similarly, actualPIOperLIO = actualPIO / actualLIO.

A current PIOC (currPIOC) is calculated using these proportioned actual and estimated values, so as to account for possible stale/missing statistics, incorrect scan-count estimation etc.:

currPIOC=actualPIOperLIO/estimatedPIOperLIO

In order to account for the possibility that a very cold object that comes into the cache transiently and shouldn't be considered hot, which may result in wild swings in PIOC values, a newPIOC is calculated by averaging the currPIOC over 'p' iterations, newPIOC=(p−q)oldPIOC+q*currPIOC/p where, 'p' refers to a PIOC factor window and 'q' refers to a PIOC factor weight. These chosen 'p' and 'q' values control the weight given to the oldPIOC and the currPIOC. By tuning these values, for example, it is possible to control the PIOC learning to be more oriented to the recent queries on the object in the history or can give equal weight to the recent queries as that of old queries on the object in the history, as is well appreciated by those skilled in the art.

An additional consideration is made for the distribution of index and data among the small and large mass pages in the database. For example, in the following query

SELECT LI.* FROM LINEITEM LI WHERE LI.L_SHIPDATE>'2004-01-01' it is possible that among the total actualPIOs, few PIOs are made for index pages and few are made for data pages. This can occur when an assumption is made that there is an NC index on L_SHIPDATE of LINEITEM table, so that the index pages are traversed and the qualifying RIDs are collected to make corresponding data page lookup to answer the query.

For performance reasons, usually, databases are tuned to make sure that index pages are always available in the cache. In ASE, for example, it is possible to bind the index and data pages of an object to different caches/pools in order to improve cache hits and thereby improve performance. Further, it is also possible in ASE for a DBA to configure any number of buffer caches, where each named cache can be configured as a set of pools up to a given number (e.g., 4), and each pool can have different page sizes (where the page size is called a mass), e.g., $2^0 *s-2^3*s$, where 's' refers to a default server page size. Each table/index can be bound to a named cache. The optimizer 166 may use information like the number of pages of the object being accessed, how clustered the pages are, etc., to determine whether to use a large mass page (using prefetch) or use a small mass page to access the object. The optimizer 166 passes these hints to the buffer manager to choose the pool for accessing the object.

Given the possibility of the distribution of data and index pages, there is a possibility of incorrect cache behavior predictions by the compensated PIOC value if the distribution of index and data pages is not considered. Further, the access pattern of the data cache for a table may be different for each index with respect to PIOs, resulting in a separate data cache compensation factor associated with each index.

For example, consider an assumption that the estimatedPIO for an index scan is 300, where the distribution of (indexPIOs, dataPIOs) is (100, 200), while actualPIOs were only 100, distributed as (0, 100) i.e., no PIOs for index pages and 100 PIOs for data pages. If the distribution of the pages were not considered, it is possible that the compensated PIOC values, predict that 33% of the index and data pages are cached, while in reality, 100% of the index pages and 50% of the data pages are cached.

Therefore, to take care of this distribution, in an embodiment, additional PIOC factors are maintained separately in the system catalogs for index and data caches, resulting in one for large mass data pages, (largeMassDataPIOC), one for large mass index pages (largeMassIndexPIOC), one for small mass data pages (smallMassDataPIOC), and one for small mass index pages (smallMassIndexPIOC).

In addition to these factors for cache type and mass size, a partition factor is also maintained. Frequently, applications create hot spots in tables such that the cache hits are very high. In those cases, only a relatively small fraction of the table may be cached. In such scenarios, it is possible to correctly predict the typical access pattern by reducing the granularity of the compensated PIOC values to partition levels, so that accessing the pages of a partition will affect the PIOC value of only that partition and keep the compensated PIOC values of the other partitions unchanged.

For example, if the LINEITEM table of the TPCH database is semantically partitioned based on the value of L_ORDER- KEY, so that all the orders below a particular value are placed in a separate partition, repeated execution of a query of the following form might access the data from a single partition:

```
SELECT LI.* FROM LINEITEM LI WHERE LI.L_ORDERKEY <
500000 AND LI.L_SHIPDATE = @shipdate
```

Repeated execution of this query (even with different values bounded to @shipdate) might access data only in the single partition, thereby making it 'hot' and moving the compensated PIOC values for that table towards 0. If a different query, which is trying to access data from a different partition of the same table, comes, the compensated PIOC values would incorrectly predict that the other partition is also hot, since the compensated PIOC values are maintained at table level and indicate 0. Thus, by reducing the granularity of PIOC values to the partition level in accordance with an embodiment of the invention, such scenarios are readily avoided.

Figure 4:
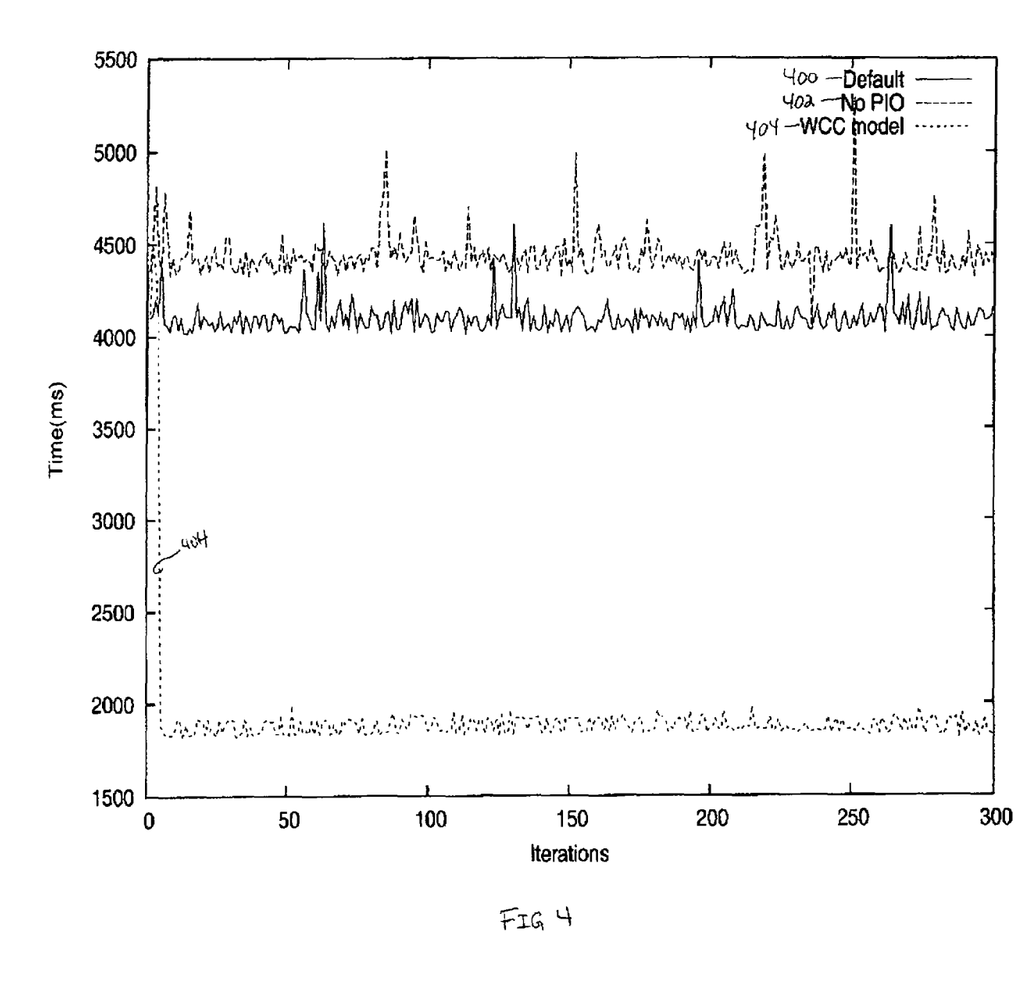
FIG. 4 depicts a graph of query execution time over iterations for an example execution for three different optimization operation modes, including a mode according to an embodiment of the invention.

An example of the potential gain in query processing through the use of the present invention is presented with reference to experimental data results. The results described were obtained using a Sybase ASE database with 4 KB server page size, on a 2 GHz (gigaHertz) AMD Opteron 8 CPU box running Red Hat 3.4.6-2 with the cache size of the server tuned to be 800 MB (megabyte), distributed as 200 MB for 4 KB page pool and 600 MB for 32 KB page pool, and the TPC-H database of 1 GB. A disk size of the whole database including the size of data, index and other metadata was about 4.5 GB. The queries were fired as 300 sequential streams, each stream containing all the queries from TPC-H set of 22 queries in a random order using the qgen of TPC-H 2.8.0 standard specification, for the random stream generation, as is well understood in the art. The execution module of ASE was extended to recalculate PIOC factors and store them in system tables, so that they were available for subsequent optimizations. The system tables containing the compensated PIOC values were cached in the memory, to avoid high PIOC maintenance costs. The values for 'p' (PIOC factor window) and 'q' (PIOC factor weight) discussed above, were taken to be 100 and 1 respectively. FIG. 4 illustrates a graph that shows the execution time taken for execution of TPCH Query 16 in each of three modes, Default: default optimization, shown as line 400, No_PIO: optimization assuming no PIO is spent on any object, shown as line 402, and WCC (warm cache costing): optimization using the novel feedback optimization technique for considering buffer cache contents of the invention, shown as line 404, where TPCH Query 16 is:

```
SELECT P_BRAND, P_TYPE, P_SIZE,
COUNT(DISTINCT PS_SUPPKEY) AS SUPP_CNT
FROM PART, PARTSUPP
WHERE P_PARTKEY = PS_PARTKEY
AND P_BRAND <> 'Brand#44'
AND P_TYPE NOT LIKE 'STANDARD ANODIZED'
AND P_SIZE IN (8, 46, 20, 19, 26, 41, 14, 18)
AND PS_SUPPKEY NOT IN (
SELECT S_SUPPKEY
FROM SUPPLIER
WHERE S_COMMENT like '%Customer%Complaints%')
GROUP BY P_BRAND, P_TYPE, P_SIZE
ORDER BY SUPP_CNT DESC, P_BRAND, P_TYPE, P_SIZE
```

In Default mode, the elements of the OR list were consumed into an in-memory table, and a nested-loop join between this in-memory or-list and the index PI_PSIZE was performed. This is based on a cost based decision taken by the optimizer. It can be seen from the following listing of time taken (in milliseconds, ms) that it is a better choice compared to doing a sequential scan on PART table when the cache is cold. But when the cache is warm with the data pages of PART table, the time taken for this plan is more than twice to that of the sequential scan.

| | Cache state: | |
|---|---|---|
| | cold | warm |
| PART_X: | 4633 | 1760 |
| PI_PSIZE: | 4360 | 4170 |

While evaluating the query under the WCC mode in accordance with the invention, over iterations, it was identified that table PART is almost completely cached, and therefore, it is cheaper to do a sequential scan of PART and restrict the rows by applying the predicates, rather than using the or-list to probe the index, as is well understood in the art. As can be seen from line 404 in FIG. 4, significant time savings can be realized through the use of the present invention in such a manner.

Figure 5:
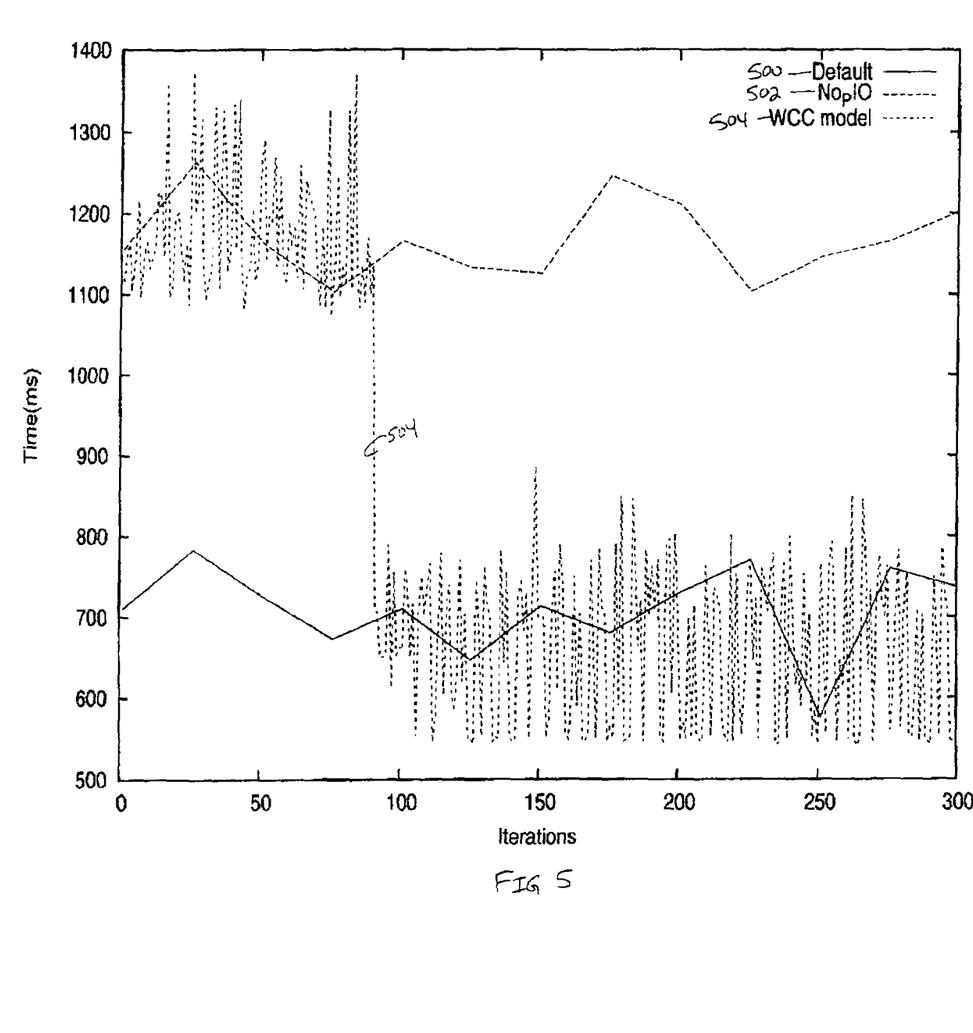
FIG. 5 depicts a graph of query execution time over iterations for another example execution for three different optimization operation modes, including a mode according to an embodiment of the invention.

A further example illustrates the ability of the embodiments to account for the behavior of the compensated PIOC values when an object moves out of cache after it was learned to be hot. Reference is made to FIG. 5 which illustrates a graph of execution time over iterations for the Default mode, shown as line 500, the No_PIO mode, shown as line 502, and the WCC mode, shown as line 504, for execution of TPCH Query 4:

```
SELECT O_ORDERPRIORITY,
COUNT(*) AS ORDER_COUNT
FROM ORDERS O
WHERE O_ORDERDATE >= '1995 - 04 - 01'
AND O_ORDERDATE < DATEADD(month, 3, '1995 - 04 - 01')
AND EXISTS (
SELECT *
FROM LINEITEM
WHERE L_ORDERKEY = O.O_ORDERKEY
AND L_COMMITDATE < L_RECEIPTDATE )
GROUP BY O_ORDERPRIORITY
ORDER BY O_ORDERPRIORITY DESC
```

Hand-tuning the compensated PIOC values for index LINEITEM_X and table LINEITEM to 0.5 was done to imply that 50% of the index and the data were cached. Initially, with the WCC model, index LINEITEM_X was part of the best plan. This corresponded to the same plan selected in the No_PIO mode, which assumed that the whole database is available in cache and no PIO was spent for accessing any object. Over iterations the WCC model, correctly identified that the actual-PIO spent on LINEITEM_X was greater then estimated. Also, since index LINEITEM_ORDERS was being used to access LINEITEM table in many other queries, the compensated PIOC value for this index moved towards 0 more quickly. This allowed the cost of index LINEITEM_ORDERS to be cheaper than that of LINEITEM_X. As shown in the graph of execution time of FIG. 5, the WCC model, represented by line 504, started selecting LINEITEM_ORDERS as part of its best plan after about 100 iterations. Thus, as desired, the embodiments of the invention provide for objects constantly found in the cache over iterations to be favored, if the cost advantages because of PIO saving is better than the cost of other competitive plans.

This savings in execution time that is realized further demonstrates that the maintenance of the PIOC factors, e.g., a combination of object, partition, cache type, and mass size, that are updated at the end of execution for each query in the system do not significantly impact performance. This is particularly true as the execution time of the query increases. By way of example, consider two database tables, one which is 365 way partitioned (partTab) and another which is single partitioned (singleTab), each loaded with 4000 rows. A query with a WHERE clause predicate, which selects a set of rows from n partitions out of the 365 in the case of partTab is compared to the same query on the singleTab to measure the additional cost spent to update the PIOC values of n partitions. The cost for execution of the query and the maintenance of PIOC values for 300 partitions was found to be 6 ms, while the cost for execution on a single partition table along with single PIOC update was found to be 3 ms. Though the 100% extra cost perhaps may appear significant, this cost is constant irrespective of the number of rows in each of the partitions, or the number of rows selected by the query.

Further, the extra cost for maintenance is negligible in case of queries selecting data from less than 50/100 partitions, which is generally the case for most of the queries. As is commonly understood, if any query is accessing more than 300 partitions of the table, it is likely a report generation query, which runs for quite some time and the extra cost for maintenance will be insignificant, particularly if a new plan is selected as a result of the memory I/O awareness and gives fair advantage in query execution time with respect to the old plan.

As described, the embodiments of the present invention result in significant improvement in query execution time through memory I/O awareness and feedback to an optimizer by considering buffer cache contents during query optimization with negligible overhead. In an aspect, the maintenance of the compensated PIOC values occurs at a partition level. It is recognized that it may be possible for a very selective point query within a single partition to move the compensated PIOC values for that partition from 1 to 0, thereby suggesting that the data of the whole partition is cached. This situation can arise if the buffer manager operates at a page-level with the compensated PIOC value operating at a partition level. In accordance with a further aspect, the learning of PIOC values may be done such that only those queries which scan at least some threshold percentage, x %, (e.g., 5%) of the pages of the partition are considered.

Further, it may occur that there are many queries for which there is a single plan dominating other candidate plans, i.e., the plan is optimal under most circumstances as a result of the object being partially cached to completely cached. Accordingly, caching that single plan as the candidate plan for that query may be done irrespective of the cache contents.

In addition, generally in production database systems, there would be a defined workload pattern that is followed/observed. In those systems, it might be possible that there are a few sets of tables (or portions of tables) that are always 'hot', indicating that there is only a small portion of the cache which is dynamic and constantly changing. In such scenarios, it might be advantageous to freeze compensated PIOC values learned for those hot tables once the performance of the system is satisfactory with respect to the selection of plans. Later these compensated PIOC values could be used as representations of cache occupancy for future optimizations. This might be particularly useful when compensated PIOC values are not changing much, since the cache has reached a steady state and learning the minor swings in cache occupancy is not beneficial.

Figure 6:
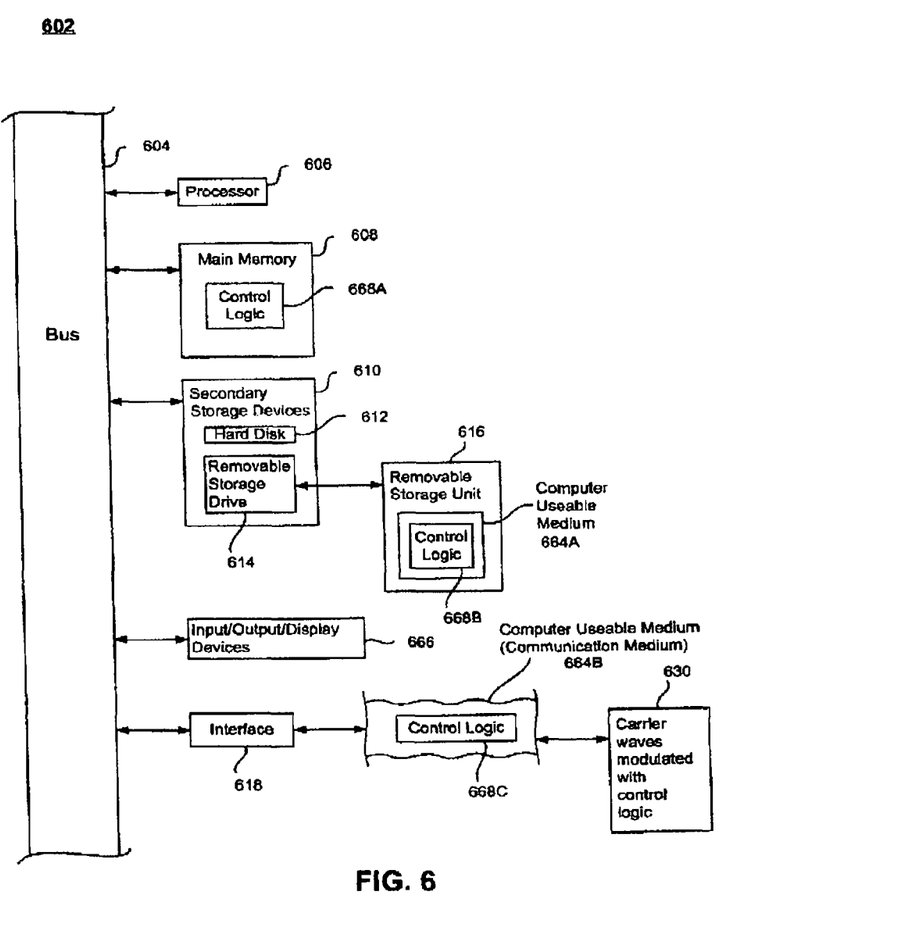
FIG. 6 illustrates an example computer useful for implementing components of embodiments of the invention.

In an embodiment of the present invention, the system and components of embodiments described herein are implemented using well known computers, such as example computer 602 shown in FIG. 6. For example, database management system 140 or server 130 can be implemented using computer(s) 602.

The computer 602 can be any commercially available and well known computer capable of performing the functions described herein, such as computers available from International Business Machines, Apple, Sun, HP, Dell, Compaq, Digital, Cray, etc.

The computer 602 includes one or more processors (also called central processing units, or CPUs), such as a processor 606. The processor 606 is connected to a communication bus 604.

The computer 602 also includes a main or primary memory 608, such as random access memory (RAM). The primary memory 608 has stored therein control logic 668A (computer software), and data.

The computer 602 also includes one or more secondary storage devices 610. The secondary storage devices 610 include, for example, a hard disk drive 612 and/or a removable storage device or drive 614, as well as other types of storage devices, such as memory cards and memory sticks. The removable storage drive 614 represents a floppy disk drive, a magnetic tape drive, a compact disk drive, an optical storage device, tape backup, etc.

The removable storage drive 614 interacts with a removable storage unit 616. The removable storage unit 616 includes a computer useable or readable storage medium 664A having stored therein computer software 668B (control logic) and/or data. Removable storage unit 616 represents a floppy disk, magnetic tape, compact disk, DVD, optical storage disk, or any other computer data storage device. The removable storage drive 614 reads from and/or writes to the removable storage unit 616 in a well known manner.

The computer 602 also includes input/output/display devices 666, such as monitors, keyboards, pointing devices, etc.

The computer 602 further includes a communication or network interface 618. The network interface 618 enables the computer 602 to communicate with remote devices. For example, the network interface 618 allows the computer 602 to communicate over communication networks or mediums 664B (representing a form of a computer useable or readable medium), such as LANs, WANs, the Internet, etc. The network interface 618 may interface with remote sites or networks via wired or wireless connections.

Control logic 668C may be transmitted to and from the computer 602 via the communication medium 664B. More particularly, the computer 602 may receive and transmit carrier waves (electromagnetic signals) modulated with control logic 630 via the communication medium 664B.

Any apparatus or manufacture comprising a computer useable or readable medium having control logic (software) stored therein is referred to herein as a computer program product or program storage device. This includes, but is not limited to, the computer 602, the main memory 608, secondary storage devices 610, the removable storage unit 616 and the carrier waves modulated with control logic 630. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method comprising:
    determining a unit physical I/O (PIO) mis-estimation based on a proportion between an estimated PIO cost and an estimated logical I/O operations (LIO) cost, and a proportion between an actual PIO cost and an actual LIO cost;
    determining a current compensated PIO cost utilizing the unit PIO mis-estimation; and
    generating new compensated PIO cost values, indicative of PIO operations and memory I/O operations, by averaging the current compensated PIO cost value over multiple iterations;
    utilizing the new compensated PIO cost values as feedback to a query optimizer of the DBMS that selects query execution plans for future queries.

2. The computer-implemented method of claim 1 wherein generating the new compensated PIO cost values further comprises determining average fractional ratios between an estimated PIO cost and an actual PIO cost of at least one of index scans and table scans in query execution, wherein the actual PIO cost differs from the estimated PIO cost due to at least one of cache hits and cache occupancy.

3. The computer-implemented method of claim 1 further comprising dynamically maintaining and updating the new compensated PIO cost values in system tables of the DBMS as queries are executed.

4. The computer-implemented method of claim 1, further comprising:
    generating the new compensated PIO cost values based at least on an approximate cache occupancy level, wherein the approximate cache occupancy level comprises an approximate distribution of index and data among small and large mass pages in the database.

5. The computer-implemented method of claim 4, wherein generating the new compensated PIO cost values further comprises capturing execution metrics indicative of memory I/O operations during query execution substantially non-intrusively using the approximate cache occupancy level.

6. The computer-implemented method of claim 1 wherein the new compensated PIO cost values further comprise values relative to a partition level of a table.

7. The computer-implemented method of claim 1 wherein the utilizing further comprises utilizing the new compensated PIO cost values in a costing module of the query optimizer.

8. The method of claim 1, wherein the determining a unit PIO mis-estimation comprises:
    calculating a first unit PIO mis-estimation value by proportioning the estimated PIO and the estimated LIO; and
    calculating a second unit PIO mis-estimation value by proportioning the actual PIO and the actual LIO, wherein the current compensated PIO cost is determined by proportioning the first unit PIO mis-estimation value and the second unit PIO mis-estimation value.

9. The method of claim 1, wherein the new compensated PIO cost values are dependent on a compensated PIO factor window and a compensated PIO factor weight, wherein the compensated PIO factor window and the compensated PIO factor weight determine an efficiency weight given to an old compensated PIO cost and the current compensated PIO cost.

10. A computer-based system for comprising:
    a memory; and
    at least one processor coupled to the memory and configured to:
        determine a unit physical I/O (PIO) mis-estimation based on a proportion between an estimated PIO cost and an estimated logical I/O operations (LIO) cost, and a proportion between an actual PIO cost and an actual LIO cost,
        determine a current compensated PIO cost utilizing the unit PIO mis-estimation, and
        generate new compensated PIO cost values, indicative of PIO operations and memory I/O operations, by averaging the current compensated PIO cost value over multiple iterations; and
    the at least once processor is further configured to utilize the new compensated PIO cost values as feedback to a query optimizer of the DBMS that selects query plans for future queries.

11. The system of claim 10, wherein the at least one processor is further configured to determine average fractional ratios between the estimated PIO cost and the actual PIO cost of at least one of index scans and table scans in query execution, wherein the actual PIO cost differs from the estimated PIO cost due to at least one of cache hits and cache occupancy.

12. The system of claim 10, wherein the at least one processor is further configured to dynamically maintain and update the new compensated PIO cost values in system tables of the DBMS as queries are executed.

13. The system of claim 10, wherein the at least one processor is further configured to generate the new compensated PIO cost value based at least on an approximate cache occupancy level, wherein the approximate cache occupancy level further comprises an approximate distribution of index and data among small and large mass pages in the database.

14. The system of claim 13, wherein the at least one processor is further configured to:
- capture execution metrics indicative of memory I/O operations during query execution substantially non-intrusively using the approximate cache occupancy level, and
- utilize the captured execution metrics in a costing module of the query optimizer.

15. The system of claim 10, wherein the new compensated PIO cost values further comprise values relative to a partition level of a table.

16. A computer program product including a non-transitory computer-readable medium having instructions stored thereon that, when executed by a processing device, cause the processing device to perform operations comprising:
- determining a unit physical I/O (PIO) mis-estimation based on a proportion between an estimated PIO cost and an estimated logical I/O operations (LIO) cost, and a proportion between an actual PIO cost and an actual LIO cost;
- determining a current compensated PIO cost utilizing the unit PIO mis-estimation; and
- generating new compensated PIO cost values, indicative of PIO operations and memory I/O operations, by averaging the current compensated PIO cost value over multiple iterations;
- utilizing the new compensated PIO cost values as feedback to a query optimizer of the DBMS that selects query execution plans of future queries.

17. The computer program product of claim 16, the operations further comprising:
- determining average fractional ratios between the estimated PIO cost and the actual PIO cost of at least one of index scans and table scans in query execution, wherein the actual PIO cost differs from the estimated PIO cost due to at least one of cache hits and cache occupancy, and wherein the average fractional ratios are determined by dividing the actual PIO cost by the estimated PIO cost.

18. The computer program product of claim 16, the operations further comprising:
- dynamically maintaining and updating the new compensated PIO cost values in system tables of the DBMS as queries are executed.

19. The computer program product of claim 16, the operations further comprising:
- generating the new compensated PIO cost values based at least on an approximate cache occupancy level, wherein the approximate cache occupancy level comprises an approximate distribution of index and data among small and large mass pages in the database.

20. The computer program product of claim 19, the generating further comprising capturing execution metrics indicative of memory I/O operations during query execution substantially non-intrusively using the approximate cache occupancy level.

21. The computer program product of claim 16 wherein the new compensated PIO cost values further comprise values relative to a partition level of a table.

22. The computer-implemented method of claim 16, the utilizing further comprising utilizing the new compensated PIO cost values in a costing module of the query optimizer.

* * * * *